PULSING CIRCUIT USING PUNCH-THROUGH TRANSISTOR

Filed June 25, 1956 2 Sheets-Sheet 1

INVENTOR
BY ERIC WOLFENDALE
Fred M. Vogel
AGENT

PULSING CIRCUIT USING PUNCH-THROUGH TRANSISTOR

Filed June 25, 1956 2 Sheets-Sheet 2

INVENTOR
BY ERIC WOLFENDALE
Fred M. Vogel
AGENT

United States Patent Office 3,049,677

Patented Aug. 14, 1962

3,049,677

PULSING CIRCUIT USING PUNCH-THROUGH TRANSISTOR

Eric Wolfendale, Tudor Close Smallfield, Horley, England, assignor, by mesne assignments, to North American Philips Company, Inc., New York, N.Y., a corporation of Delaware

Filed June 25, 1956, Ser. No. 593,704

Claims priority, application Great Britain June 27, 1955

15 Claims. (Cl. 331—111)

This invention relates to a method for producing voltage changes having a very steeply rising front edge by means of a junction transistor having emitter-, base and collector electrodes and to a very fast trigger circuit for producing voltage changes according to this method, which trigger circuit may be bistable, monostable or astable.

In experimenting with junction transistors, it appears that they exhibit a number of different turn-over voltages at which the collector-current may increase rapidly. This behaviour is shown in the collector-current collector voltage ($I_c/V_c$) graph of FIG. 1 of the accompanying drawings.

Of these voltages, $V_Z$ is the well-known collector-base turn-over voltage at which the current between collector and base electrodes with disconnected emitter electrode increases rapidly. It has long been called "Zener-voltage," the turnover being ascribed to the Zener effect.

The turn-over voltage $V_B$ is the so-called "avalanche voltage." Both $V_Z$ and $V_B$ correspond to zero emitter-current ($I_e=0$). The $V_B$ characteristic is due to the fact, that any electron or hole penetrating into the depletion layer between base and collector becomes accelerated by the electric field therein and may collide with a nucleus and produce a hole-electron pair, which are also accelerated and may produce further hole-electron pairs by collision. The result of this process is a charge-carrier multiplication by a factor $$M=\frac{1}{1-\left(\frac{C}{V_B}\right)^n}$$

wherein $V_c$ is the actual collector voltage and $n$ is a constant, which is for example approximately equal to 3 in the case of a pnp-junction transistor and at normal current densities.

In any given transistor, either $V_Z$ or $V_B$ has the lower value according to the resistivity $\rho$ of the base material. Thus in practice only the turn-over voltage of the lower value exists, but the current multiplication by the factor M applies in any case.

A third turn-over voltage $V_X$, occurs with open-circuited base (base-current $I_b=0$), due to the fact that the emitter current is multiplied in the depletion layer by the factor M and therefore $\alpha$ increases with increasing collector voltage.

As $\alpha$ tends towards 1, so $$\alpha'=\frac{\alpha}{1-\alpha}$$

tends towards infinity, as illustrated by the graph of FIG. 2 of the accompanying drawings. Therefore, $I_e$ being known to be equal to $(\alpha'+1)\ I_{co}$ tends towards infinity together with $\alpha'$ and the turn-over voltage $V_X$ occurs where $\alpha$ reaches the value I.

It has already been proposed to use a junction transistor in the region lying between the $V_X$ and $V_B$ or $V_Z$ characteristics where, owing to the charge-carrier multiplication in the depletion layer, it exhibits a current amplification $\alpha$ larger than one and its behaviour is comparable to that of a point-contact transistor. Under those circumstances, if one introduces an impedance of adequate magnitude between the base and emitter electrodes of a junction transistor and applies a reverse bias voltage equal to or larger than $V_B$ or $V_Z$ between its collector and its emitter-electrode via a load impedance, the base current produced by application of this voltage and flowing through the base-emitter impedance sets up there-across a forward bias voltage which eventually overcomes the initial reverse bias voltage, if any, so that an emitter current starts flowing. Due to the fact that the emitter-collector current amplification factor $\alpha$ is larger than one in the region considered and that the base-emitter impedance therefore has a regenerative action, this emitter-current increases until the collector-emitter voltage has dropped to the value of the turn-over voltage $V_X$ of the transistor, when $\alpha$ again becomes smaller than or equal to one.

In dynamical operation, it is possible to obtain larger voltage drops across the load due to charge-carrier storage in the transistor and operation in this mode may be obtained with the aid of a condenser connected between its collector and emitter electrodes. However, a large capacitor of say several 1000 pf. is required to ensure voltage drop to substantially zero collected emitter voltage and this capacitor evidently limits the operating frequency, for instance the repetition frequency of pulses produced by means of the circuit.

Moreover the unavoidable leakage current ($I_{co}$) flowing in the collector-base diode section of a junction transistor is temperature dependent and the $V_B$ or $V_Z$ turnover voltage is also temperature dependent. The $V_X$ turn-over voltage is also temperature dependent because the emitter-collector current amplification factor $\alpha$ of the known junction transistors is temperature dependent. The negative-resistance break-down characteristic along which a junction transistor device can be made to operate between the $V_B$ or $V_Z$ and the $V_X$ turn-over voltages is even more temperature dependent, since the shape and position of this characteristic is dependent on the amplification factor $\alpha$, on the collector-base leakage current ($I_{co}$) and on the value of the impedance connected between the base and emitter electrodes. Thus the addition of an impedance connected between emitter and base finally results in a complex temperature dependence even in the ideal case of an impedance having no temperature dependence of its own.

The present invention aims at ensuring substantially temperature independent and improved operation of a device of similar general type.

It is based upon the fact that, when the base layer of the transistor is of relatively small thickness and/or conductivity, as is the case for example with high frequency transistors, a further turn-over can be observed at a voltage intermediate between $V_X$ and $V_B$ or $V_Z$ (according to which is lowest), when the emitter-base circuit of the transistor is closed and the field between the base and collector electrodes inhibits the sudden rise of the collector current at the third and lowermost turn-over voltage $V_X$. No impedance and no reverse bias-voltage between the base and emitter electrode are necessary for ensuring occurrence of this new turn-over. It is supposed that the collector depletion layer extends through the base up to the emitter and that a so-called "punch-through" turn-over occurs. It has been discovered that, if this fourth turn-over voltage or "punch-through voltage" $V_P$ is materially higher than $V_X$, the multiplication factor M is materially larger than 1, the collector current $I_c$ rises very suddenly up to a region of high current-densities and the turn-over characteristic $V_P$ shown on FIG. 3 of the accompanying drawings is continued by an heretofore unknown break-down characteristic $V_W$ along which the collector-emitter and base path of the transistor exhibits a considerable negative resistance. This static break-down characteristic extends down to a voltage value lower than that of the turn-over voltage $V_X$ with open base-circuit.

It has been found that the increase of the collector-current along the $V_P$ and $V_W$ characteristics is much faster than along any known turn-over characteristic, and that the field between the collector and base electrodes loses control over the collector current as soon as the voltage $V_P$ is reached and the collector current starts to rise steeply, the collector current and voltage of the transistor varying in a manner similar to the anode current and voltage of a gas discharge tube after it has fired.

Owing to the fact that the static $V_W$ characteristic extends down to low voltage values at high current densities and that, due to space charge or charge-carrier storage effects, the dynamical $V_W$ characteristic extends down even practically to zero voltage values, a transistor can be operated on said characteristic with less danger of being destroyed or damaged due to overloading or excess dissipation.

The $V_W$ breakdown characteristics correspond to constant base-emitter bias voltage and it has been found that, if an impedance is included in the base emitter circuit and exceeds a certain value, the rising current between collector and base electrodes may provide a forward bias overcoming the applied reverse bias voltage, if any, so that the break-down characteristic $V_W$ starts at a lower value of the collector current and/or extends further or more rapidly towards the low collector-emitter voltage condition. In this case, the break-down occurs along a characteristic of increased negative resistance which intersects a family of $V_W$ curves starting all on the same, $V_P$ curve but at different collector current values and corresponding each to a particular base-emitter bias voltage.

It is a principal object of the present invention to make use of the "punch-through" and break-down characteristics described hereabove for producing by means of a junction transistor, voltage changes having a very steeply rising front edge, without destroying or damaging the transistor.

According to the invention, the method is characterised by the step of applying across the series combination of a load impedance and of the collector to emitter and base paths of the transistor an inverse voltage substantially in excess of the value at which incremental collector-current of the transistor becomes larger than its emitter-current but lower than the turn-over voltage of said transistor with open emitter-circuit and by the fact that use is made of a transistor having a base layer of such small thickness and/or conductivity that on application of said voltage the collector depletion layer extends through the base layer up to the emitter-base junction and a discharge current flows beween said collector- and both the base and emitter-electrode, whereby the discharge current is sustained until the collector-emitter voltage has collapsed to a value substantially lower than its characteristic turn-over value $V_X$ for zero base current.

A very fast trigger circuit according to the invention is characterized in that it comprises the series combination of a load impedance and of the collector to emitter and base paths of said transistor, the circuit of the base-electrode of the transistor being conductively and practically directly returned to its emitter electrode, and biasing means for applying, between said collector electrode and said base and emitter electrodes, an inverse voltage in excess of the value at which the incremental collector-current of the transistor becomes larger than its emitter-current but lower than the turn-over voltage of said transistor with open emitter-circuit, and in that the base layer of the transistor is of such small thickness and/or conductivity, that application of the said voltage initiates through said collector-base and collector-emitter paths a current discharge which is sustained until the collector-emitter voltage has collapsed to a value substantially lower than its characteristic turn-over value for zero base current.

The principal advantages of the method and of the trigger-circuit specified hereabove resides in the heretofore unknown rapidity of the collector-current rise, and in the fact that the turn-over voltage $V_P$ is determined by the internal field configuration between the collector- and emitter-electrode of the transistor and is thus substantially independent from the internal or ambient temperature and from other operating conditions. The said voltage may, however be subject to variations under the influence of corpuscular radiations.

Other optional advantages are that the circuit can be made to operate with a substantially direct or even internal or integral connection between the base- and emitter-electrodes and/or without any notable external capacity between the collector- and emitter-electrodes. Since the current rise is extremely fast, a much smaller quantity of stored charge carriers is sufficient for insuring collapse of the collector-emitter and base voltage to practically zero value. In fact, the capacity of external leads or another capacity of the same order of magnitude as the internal collector-emitter capacity of the transistor, e.g. a capacitor of say 15 pf. is sufficient for obtaining collapse of the collector-emitter and base voltage down to a value substantially lower than that of the lowermost turn-over voltage $V_X$.

A base-emitter impedance and/or a voltage source providing reverse bias of the base with respect to the emitter may, however, be useful, e.g. for the purpose of base-triggering and/or synchronizing the circuit. The position and shape of the break-down characteristic along which the transistor is operating then also becomes somewhat temperature dependent, because of the subsidiary regenerative action which takes place in the impedance of the base-emitter circuit.

The invention may be more clearly understood by reference to the following specification and the accompanying drawings, in which.

Figure 4:
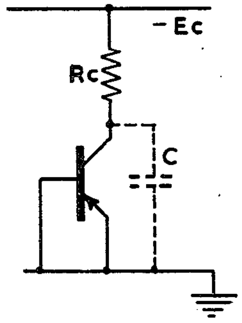
FIGS. 4–6 are circuit diagrams of relaxation oscillators embodying the present invention.

Referring first to FIGURE 4, the circuit comprises a p-n-p junction transistor or equivalent two-terminal device in which a constant zero base bias potential is maintained by a direct connection between base and emitter. The transistor or equivalent has its emitter-collector path in series with a load $R_c$ connected to a collector supply point at a supply potential $E_c$.

Figure 5:
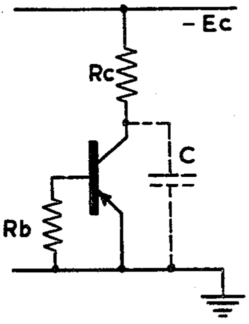

In the circuit of FIGURE 5, a zero initial bias potential is maintained by a connection between base and emitter, said connection including an impedance $R_b$ which provides a regenerative action.

Figure 6:
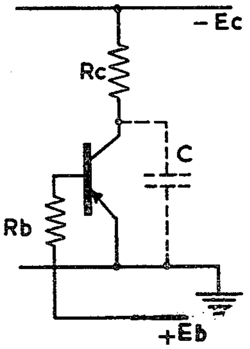

The circuit of FIGURE 6 is similar to that of FIGURE 5, the sole difference being the provision of a bias voltage source $E_b$ for supplying a reverse initial bias voltage in place of the zero initial bias of FIGURE 5.

With these circuits, at a certain critical value of supply voltage $-E_c$ the transistor produces a relaxation oscillation.

The waveform of collector voltage is a sawtooth and the emitter current occurs in pulses.

One type of transistor used was an experimental high frequency junction transistor with a cut-off frequency of 8 mc./s., and the rise time at the collector was found to be less than .009 μsec. The duration of the emitter current pulse was estimated to be .004 μsec. with an amplitude of about 50 ma. The period of the oscillation was measured as approximately 0.1 μsec. and the amplitude of oscillation was approximately equal to the supply voltage $-Ec$.

The speed of operation was at least ten times better than could be achieved using the same transistor in conventional circuits.

Figure 1:
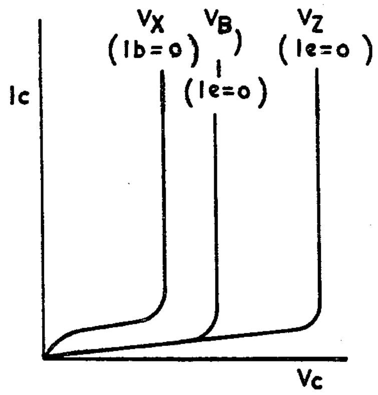
FIG. 1 is a collector current-collector voltage characteristic curve of a junction transistor, illustrating various turn-over characteristics.
Figure 2:
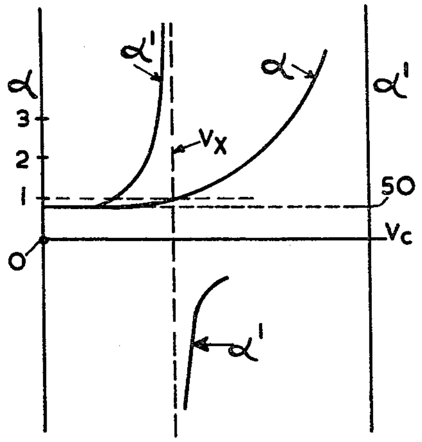
FIG. 2 is a curve illustrating $\alpha$ and $\alpha'$ of a transistor as a function of collector voltage.
Figure 3:
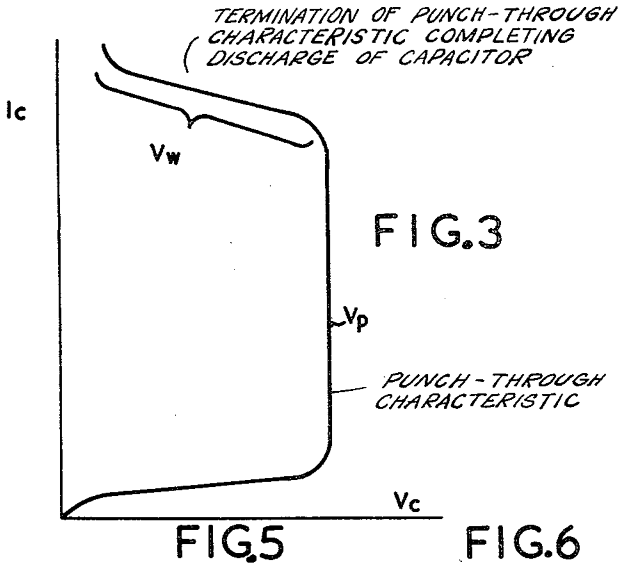
FIG. 3 is a curve illustrating the "punch-through" turn-over characteristics of a transistor.

The capacitance C, which may be the internal capacitance alone or with external capacitance, charges towards $Ec$ till, at a critical voltage equal to $V_P$ punch-through occurs. The collector current then increases, as described with reference to FIGURE 3, into the region $V_W$, the increased current being taken from the capacitance. Capacitance C thus discharges rapidly into the transistor while the voltage $V_c$ across the transistor falls to a voltage much smaller than $V_X$ or nearly zero. Completion of the discharge causes the transistor to cut off after which the voltage $V_c$ across the transistor rises again and the cycle is repeated.

Figure 7:
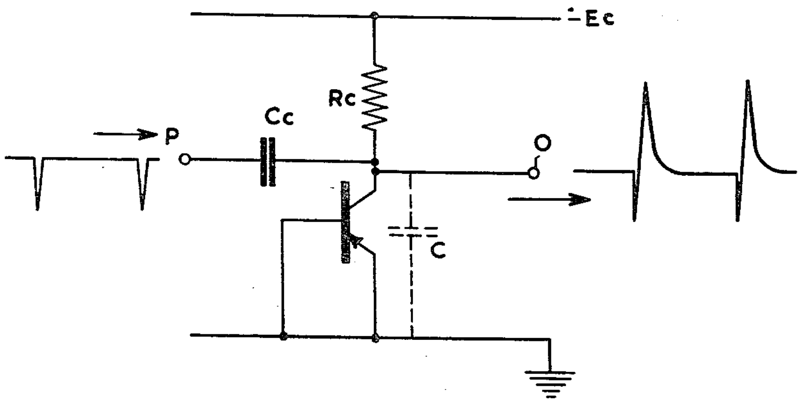
FIG. 7 is a circuit diagram of a pulse regeneration circuit according to the invention.

The circuit of FIGURE 4 can inter alia form the basis of pulse regeneration or pulse forming circuits, dynamic bistable circuits and triggered pulse generators, and trigger pulses may be applied to the collector. Thus for example FIGURE 7 shows a pulse regeneration circuit in which negative-going input pulses having relatively slow rise time may be applied to an input point P coupled to the collector by means of a capacitor $Cc$, while output pulses having faster rise time may be obtained from an output terminal O connected to the collector. The approximate waveform of said output pulses is shown alongside the output terminal, the lower part corresponding to the original wave while the upper part represents regenerated pulses having reduced rise time. In this circuit the potential $Ec$ is set below the punch-through voltage $V_P$, but the sum of the supply voltage $Ec$ and the input pulse voltage exceeds $V_P$.

Figures 8, 9:
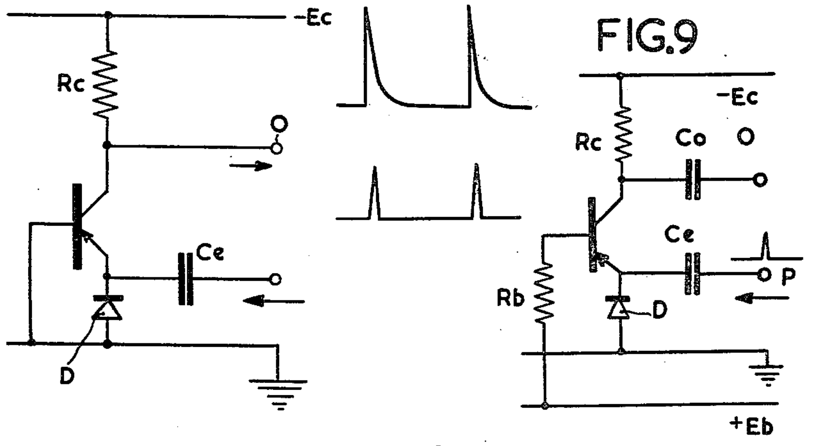
FIG. 8 is a circuit diagram of a modification of the circuit of FIG. 7.
FIG. 9 is a circuit diagram of a modification of the circuit of FIG. 8.

An alternative pulse regeneration circuit suitable for accepting positive input pulses is shown in FIGURE 8. In this circuit the input pulses are applied to an input terminal P coupled to the emitter by means of a capacitor $Cc$, while output pulses of a waveform approximately as shown are derived from the collector or output terminal O. In this circuit the emitter is grounded through a rectifier D in accordance with the aforesaid modification of the invention, the constancy of the bias potential being momentarily interrupted by the trigger voltages applied across the rectifier in its reverse direction. Thus the presence of rectifier D permits triggering at the emitter in place of triggering at the collector e.g. as used in the circuit of FIGURE 7. On the other hand, the circuit of FIGURE 8 may be modified slightly to permit use of a two-terminal device and permit emitter triggering without recourse to said modification of the invention. All that is required is for the rectifier D to be removed from the emitter-base connection (which thus reverts to a direct connection as in FIGURES 4 and 7) and inserted in the lead between said connection and earth.

FIGURE 9 shows a modification of the circuit of FIGURE 8 in which a reverse bias voltage $+Eb$ is applied to the base-electrode via a resistor $Rb$, as in the circuit of FIGURE 6, while output pulses are derived from the collector via a blocking capacitor $Co$ connected to the output terminal O.

Figure 10:
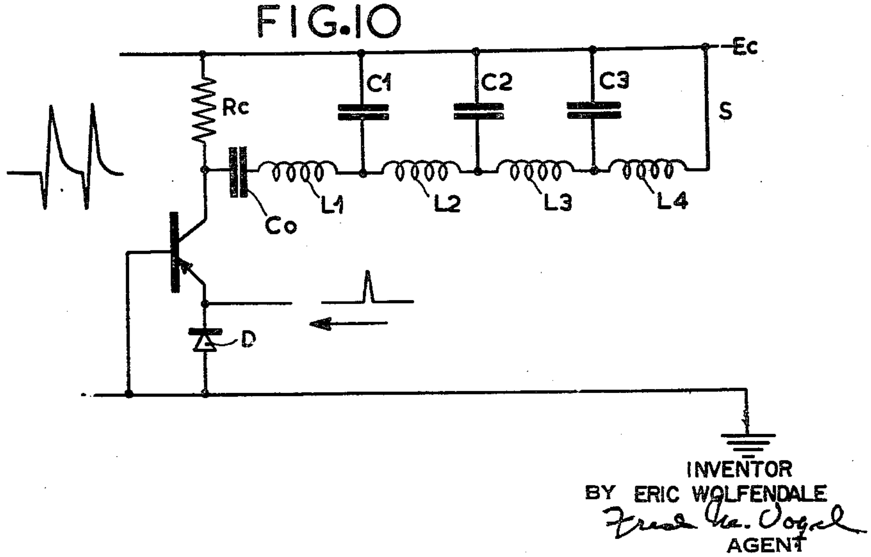
FIG. 10 is another modification of the circuit of FIG. 8.

FIGURE 10 shows a triggered pulse generator employing a circuit similar to that of FIGURE 8 with a delay line comprising reactances L1 to L4 and C1 to C3. Said delay line is short-circuited at its far end at S in order to reflect and at the same time invert pulses derived from the collector through a blocking capacitor $Co$. More particularly, a positive input or starting pulse at the emitter will trigger the circuit to breakdown. The positive edge of the pulse from the collector traverses the delay line, is inverted in the short circuit S and returns to trigger the circuit again into breakdown and so forth. This circuit can be converted to a dynamic bistable circuit by providing an inhibit gate to stop pulse regeneration.

In a modification of the circuit of FIGURE 10, the short circuit S may be replaced by a terminating resistance, the junction therewith of reactance L4 being capacitively coupled back to the emitter.

As is the case of FIGURE 8, the rectifier D may be placed outside the emitter-base connection thus permitting the use of a two-terminal device.

The circuit of FIGURES 7, 8 and 10 may also be provided with a base resistance $Rb$ and/or with a source of reverse initial bias voltage $Eb$, as employed in the circuit of the FIGURES 5, 6 and 9.

The transistors with which the new $V_W$ breakdown characteristic was observed and which were employed in the circuits described hereabove were high frequency germanium junction transistors of the pnp type having a base width of a few microns, preferably comprised between 4 and 8 microns and a resistivity $\rho$ of the base material comprised between 0.5 and 10 ohm-cm. and preferably between 0.6 and 1 ohm-cm.

The internal collector capacity of an adequate sample of such a transistor was about 15 pf. at a voltage difference of 3 volts between collector and base.

What is claimed is:

1. A circuit for producing a voltage change having a steeply rising front edge comprising a junction transistor having base, emitter, and collector electrodes, said transistor having a punch-through voltage less than the avalanche breakdown and Zener-voltages, load impedance means serially connected between said collector electrode on the one hand and said emitter and base electrodes on the other, means for applying a voltage between said collector electrode and said base and emitter electrodes and capacitor means between said collector and emitter electrodes, said last-mentioned voltage having a polarity to bias said collector electrode in the reverse direction of conductivity and having a magnitude larger than the punch-through voltage of said transistor but lower than the avalanche breakdown and Zener-voltages, whereby, upon charging of said capacitor means to the punch-through voltage, punch-through breakdown occurs and the collector-emitter voltage of said transistor falls substantially to zero.

2. A circuit for producing a voltage change having a steeply rising front edge comprising a junction transistor having base, emitter, and collector electrodes, said transistor having a punch-through voltage less than the avalanche breakdown and Zener-voltages, load impedance means serially connected between said collector electrode on the one hand and said emitter and base electrodes on the other, capacitor means between said collector and emitter electrodes, and means for applying a voltage between said collector electrode and said emitter and base electrodes, said last-mentioned voltage having a polarity to bias said collector electrode in the reverse direction of conductivity and having a magnitude larger than said punch-through voltage and less than said avalanche breakdown and Zener-voltages, whereby when, upon charging of said capacitor means the voltage between said collector electrode and base and emitter electrodes reaches said punch-through voltage a discharge current flows between said collecter electrode and base and emitter electrodes and said current is sustained independently of the field between said base and collector electrodes until said voltage between said collector electrode and base and emitter electrodes has collapsed to a value substantially lower than the breakdown voltage with an open base circuit.

3. A circuit for producing a voltage change having a steeply rising front edge comprising a junction transistor having base, emitter, and collector electrodes, said transistor having a punch-through voltage less than the avalanche breakdown and Zener-voltages, a source of operating voltage, a load impedance, means connecting said impedance and source in series between said collector electrode on the one hand, and said emitter and base electrodes on the other, a source of a trigger voltage, capacitor means between said collector and emitter electrodes, and means applying said trigger voltage to the collector-emitter path of said transistor, said operating voltage and trigger voltage having a polarity to bias said collector electrode in the reverse direction of conductivity, the sum of said operating voltage and trigger voltage being greater than the voltage at which the incremental collector current of said transistor becomes larger than the emitter current of said transistor but lower than the avalanche breakdown and Zener-voltages of said transistor, whereby, upon charging of said capacitor means to the punch-through voltage, punch-through breakdown occurs and the collector-emitter voltage of said transistor falls substantially to zero.

4. A circuit for producing a voltage change having a steeply rising front edge comprising a junction transistor having base, emitter, and collector electrodes, said transistor having a punch-through voltage less than the avalanche breakdown and Zener-voltages, a source of operating voltage, a load impedance, means connecting said collector electrode to one terminal of said source by way of said impedance, rectifier means, means connecting said emitter electrode to the other terminal of said source and to said base by way of said rectifier means, a source of a trigger voltage, means applying said trigger voltage to said emitter electrode, capacitor means between said collector and emitter electrodes, said operating voltage and trigger voltage having a polarity to bias said collector electrode in the reverse direction of conductivity, the sum of said operating voltage and trigger voltage being greater than said punch-through voltage but lower than the avalanche breakdown and Zener-voltages of said transistor, whereby, upon charging of said capacitor means to the punch-through voltage, punch-through breakdown occurs and the collector-emitter voltage of said transistor falls substantially to zero.

5. The circuit of claim 4 in which said transistor is a pnp type transistor, the negative terminal of said source of operating voltage is connected to said collector by way of said impedance, the anode of said rectifying means is connected to the positive terminal of said source of operating voltage, and said trigger voltage is a positive pulse.

6. The circuit of claim 4 in which said base electrode is connected directly to said other terminal of said source of operating potential.

7. A circuit for producing a voltage change having a steeply rising front edge comprising a junction transistor having base, emitter, and collector electrodes, said transistor having a punch-through voltage less than the avalanche breakdown and Zener-voltages, a source of operating voltage, a load impedance, means connecting said collector electrode to one terminal of said source by way of said impedance, rectifier means, means connecting said emitter electrode to the other terminal of said source by way of said rectifier means, a source of a trigger voltage, means applying said trigger voltage to said emitter electrode, and reflective delay line means connected to said impedance, said operating voltage and trigger voltage having a polarity to bias said collector electrode in the reverse direction of conductivity, the sum of said operating voltage and trigger voltage being greater than the voltage at which the incremental collector current of said transistor becomes larger than the emitter current of said transistor but lower than the avalanche breakdown and Zener-voltages of said transistor.

8. The circuit of claim 6 in which said base electrode is connected directly to one terminal of said source.

9. A circuit for producing a voltage change having a steeply rising front edge comprising a junction transistor having base, emitter, and collector electrodes, said transistor having a punch-through voltage less than the avalanche breakdown and Zener-voltages, load impedance means serially connected between said collector electrode and said emitter and base electrodes, capacitor means between said collector and emitter electrodes, means connecting said base electrode to said emitter electrode substantially directly for at least one direction of current flow, and means for applying a voltage between said collector electrode and said emitter electrode, said last-mentioned voltage having a polarity to bias said collector electrode in the reverse direction of conductivity and having a magnitude larger than said punch-through voltage but lower than the avalanche breakdown and Zener-voltages, whereby, upon charging of said capacitor means to the punch-through voltage, punch-through breakdown occurs and the collector-emitter voltage of said transistor falls substantially to zero.

10. A relaxation oscillator comprising a junction transistor having base, emitter, and collector electrodes, said transistor having a punch-through voltage less than the avalanche breakdown and Zener-voltages, a load impedance, a source of operating voltage having a potential greater than said punch-through voltage and less than said avalanche breakdown and Zener-voltages, capacitor means between said collector and emitter electrodes, means serially connecting said source and impedance between said collector and emitter electrodes, said source having a polarity to bias said collector electrode in the reverse direction of conductivity, and means connecting said base electrode directly to said emitter electrode, whereby, upon charging of said capacitor means to the punch-through voltage, punch-through breakdown occurs and the collector-emitter voltage of said transistor falls substantially to zero.

11. A relaxation oscillator comprising a junction transistor having base, emitter, and collector electrodes, said transistor having a punch-through voltage less than the avalanche breakdown and Zener-voltages, a load impedance, a source of operating voltage having a potential greater than said punch-through voltage and less than said avalanche breakdown and Zener-voltages, means serially connecting said source and impedance between said collector and emitter electrodes, capacitor means between said emitter and collector electrodes, said source having a polarity to bias said collector electrode in the reverse direction of conductivity, and resistance means connecting said base electrode to said emitter electrode, whereby, upon charging of said capacitor means to the punch-through voltage, punch-through breakdown occurs and the collector-emitter voltage of said transistor falls substantially to zero.

12. A relaxation oscillator comprising a junction transistor having base, emitter, and collector electrodes, said transistor having a punch-through voltage less than the avalanche breakdown and Zener-voltages, a load impedance, a source of operating voltage having a potential greater than said punch-through voltage and less than said avalanche breakdown and Zener-voltages, means serially connecting said source and impedance between said collector and emitter electrodes, capacitor means between said emitter and collector electrodes, said source having a polarity to bias said collector electrode in the reverse direction of conductivity, a source of a bias voltage, a resistor, and means serially connecting said bias source and resistor between said base and emitter electrodes, said bias source having a polarity to bias said base electrode in the reverse direction of conductivity, whereby, upon charging of said capacitor means to the punch-through voltage, punch-through breakdown occurs and the collector-emitter voltage of said transistor falls substantially to zero.

13. A pulse forming circuit comprising a junction transistor having base, emitter, and collector electrodes, said transistor having a punch-through voltage less than the avalanche and Zener breakdown voltages, a source of an operating voltage, an impedance, means serially connecting said impedance and source between said collector electrode and said emitter and base electrodes, capacitor means between said collector and emitter electrodes, a source of a trigger voltage, and means applying said trigger voltage to said collector electrode, said trigger voltage and operating voltage having a polarity to bias said collector electrode in the reverse direction of conductivity, the sum of said operating voltage and trigger voltage being greater than said punch-through voltage but lower than said avalanche and Zener-voltages whereby, upon charging of said capacitor means to the punch-through voltage, punch-through breakdown occurs and the collector-emitter voltage of said transistor falls substantially to zero.

14. The circuit of claim 1, in which said capacitor means comprises the internal capacity of said transistor.

15. The circuit of claim 1, in which said capacitor means comprises a capacitor connected externally of said transistor.

References Cited in the file of this patent

UNITED STATES PATENTS

| | | |
|---|---|---|
| 2,644,896 | Lo | July 7, 1953 |
| 2,663,800 | Herzog | Dec. 22, 1953 |
| 2,750,509 | Endres | June 12, 1956 |
| 2,751,545 | Chase | June 19, 1956 |
| 2,790,034 | McAfee | Apr. 23, 1957 |
| 2,797,327 | Kidd | June 25, 1957 |
| 2,818,558 | Abbott | Dec. 31, 1957 |
| 2,871,376 | Kretzmer | Jan. 27, 1959 |
| 2,927,222 | Turner | Mar. 1, 1960 |

OTHER REFERENCES

Directly Coupled Transistor Circuits by Beter et al., June 1955, McGraw-Hill Pub. Co., Inc., 330 W. 42nd St., New York 36, N.Y.

Schenkel publication, Voltage Punch-Through and Avalanche Breakdown and Their Effect on the Maximum Operating Voltages for Junction Transistor, published February 8, 1955, National Electronics Conference, vol. X, pages 614–625.